(12) United States Patent
Ko et al.

(10) Patent No.: US 9,855,909 B2
(45) Date of Patent: Jan. 2, 2018

(54) AIRBAG MOUNTING APPARATUS

(71) Applicant: HYUNDAI MOBIS CO., LTD., Seoul (KR)

(72) Inventors: Seok Hoon Ko, Yongin-si (KR); Do Hyoung Kim, Yongin-si (KR); Hae Kwon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/201,798

(22) Filed: Jul. 5, 2016

(65) Prior Publication Data

US 2017/0015267 A1 Jan. 19, 2017

(30) Foreign Application Priority Data

Jul. 13, 2015 (KR) ........................ 10-2015-0099412

(51) Int. Cl.
*B60R 21/203* (2006.01)

(52) U.S. Cl.
CPC ........ *B60R 21/203* (2013.01); *B60R 21/2035* (2013.01)

(58) Field of Classification Search
CPC .......................... B60R 21/203; B60R 21/2035
See application file for complete search history.

(56) References Cited

U.S. PATENT DOCUMENTS 5,069,479 A * 12/1991 Koide ..................... B60R 21/33 280/731
5,087,069 A * 2/1992 Corbett ............... B60R 21/2035 280/731
5,409,256 A * 4/1995 Gordon ............... B60R 21/2035 280/728.2
5,556,125 A * 9/1996 Ricks .................. B60R 21/2035 24/453
5,560,642 A * 10/1996 Davidson ............ B60R 21/2035 280/728.2
5,599,039 A * 2/1997 Goss ................... B60R 21/2035 280/728.2
5,620,201 A * 4/1997 Ricks .................. B60R 21/2035 280/728.2
5,636,858 A * 6/1997 Niederman ......... B60R 21/2035 280/728.2
5,755,458 A * 5/1998 Donovan ............ B60R 21/2035 280/728.1
5,775,725 A * 7/1998 Hodac .................... B60Q 5/003 280/728.2
5,810,535 A * 9/1998 Fleckenstein ........... B60R 21/20 411/522
5,924,831 A * 7/1999 Ricks .................. B60R 21/2035 411/508

(Continued)

FOREIGN PATENT DOCUMENTS

JP 2012111325 A * 6/2012
KR 20-0387313 6/2005

*Primary Examiner* — Laura Freedman
(74) *Attorney, Agent, or Firm* — H.C. Park & Associates, PLC

(57) ABSTRACT

An airbag apparatus includes a connection clip disposed between a steering wheel and a mounting plate of an airbag; an airbag fastening part formed on the mounting plate, and having the connection clip mounted thereon; and a steering wheel fastening part formed on the steering wheel, and snap-fit fastened to the connection clip mounted on the airbag fastening part.

10 Claims, 11 Drawing Sheets

(56) References Cited

U.S. PATENT DOCUMENTS

| | | | | |
|---|---|---|---|---|
| 6,036,223 | A * | 3/2000 | Worrell | B60R 21/2035 280/728.2 |
| 6,325,408 | B1 * | 12/2001 | Ford | B60R 21/2035 280/728.2 |
| 6,695,343 | B1 * | 2/2004 | Christiansen | B60R 21/203 280/728.2 |
| 7,185,915 | B2 * | 3/2007 | Fujita | B60R 21/2037 280/731 |
| 7,264,266 | B2 * | 9/2007 | Erlingstam | B60R 21/2035 280/728.2 |
| 7,708,309 | B2 * | 5/2010 | Kim | B60R 21/2035 280/731 |
| 8,459,686 | B2 * | 6/2013 | Suzuki | B60R 21/2037 200/61.54 |
| 8,511,707 | B2 * | 8/2013 | Amamori | B60R 21/2035 280/728.2 |
| 8,919,812 | B2 * | 12/2014 | Schutz | B60R 21/2037 280/728.2 |
| 2012/0313357 | A1 * | 12/2012 | Yamaji | B60R 21/203 280/731 |
| 2016/0297390 | A1 * | 10/2016 | Raikar | B60Q 5/003 |
| 2017/0021792 | A1 * | 1/2017 | Kim | B60R 21/203 |

* cited by examiner 10
20
30
1
2
10
20
25
21
20
10
3
30
30

25
27
3
26
31
10
17
11
22
23
21
2
30
33
34
33
32
14
13
12
24

AIRBAG MOUNTING APPARATUS

CROSS-REFERENCES TO RELATED APPLICATION

The present application claims priority from and the benefit of Korean Application No. 10-2015-0099412, filed on Jul. 13, 2015, which is hereby incorporated by reference for all purposes as if fully set forth herein.

BACKGROUND

Field

The present invention relates to an airbag mounting apparatus, and more particularly, to an airbag mounting apparatus for mounting an airbag in a steering wheel.

Discussion of the Background

In general, a driver airbag of a vehicle refers to a device which can momentarily inflate an air cushion between a driver and a steering wheel when the vehicle crashes, thereby reducing an injury caused by a shock. The driver airbag includes an inflator for generating gas, an airbag cushion deployed toward a driver's seat by the generated gas, and a mounting plate having the inflator mounted thereon and coupled to the steering wheel.

When a shock is sensed by a shock sensor in case where a vehicle crashes, an electronic control module operates the inflator to rapidly generate gas, and the airbag cushion is deployed toward a driver by the generated gas. The deployed airbag cushion absorbs a part of a shock load caused by the crash while coming in contact with the upper body of the driver. When the upper body of the driver collides with the expanded airbag, the gas in the airbag serves as a buffer while being rapidly discharged through discharge holes formed in the airbag.

In the related art, when the mounting plate is coupled to the steering wheel, a snap fit pin assembled to the mounting plate is snap-fit fastened to a snap fit bush installed in the steering wheel. According to the snap fit fastening, a user can reliably fasten the mounting plate to the steering wheel through a simple operation of pressurizing the mounting plate toward the steering wheel without an inconvenient fastening process using a bolt, and easily detach the mounting plate from the steering wheel by pressurizing the fastened portion of the snap fit pin.

However, in order to manufacture the snap fit pin, a plurality of parts including a center pin member, a moving pin member, a spring member, a stopper member and a connection medium member are needed. Furthermore, in order to manufacture the snap pin bush, a plurality of bushing members are also needed. Thus, the cost of products and the number of processes are increased, and each of the parts must be passed through a plurality of processes, which makes it difficult to manage the quality. Therefore, there is a demand for a structure capable of solving such problems.

The related art of the present invention is disclosed in Korean Utility Model Registration No. 0387313 registered on Jun. 8, 2005 and entitled "Airbag housing assembly for vehicles".

SUMMARY

Embodiments of the present invention are directed to an airbag mounting apparatus capable of snap-fit fastening a mounting plate of an airbag to a steering wheel through a simpler structure.

In one embodiment, an airbag apparatus may include: a connection clip disposed between a steering wheel and a mounting plate of an airbag; an airbag fastening part formed on the mounting plate, and having the connection clip mounted thereon; and a steering wheel fastening part formed on the steering wheel, and snap-fit fastened to the connection clip mounted on the airbag fastening part.

The connection clip may include: a clip spring fastened to the airbag fastening part; and a spacer coupled to the clip spring, and contacted with the steering wheel fastening part.

The clip spring may include a metallic material, and the spacer may include a material different from the steering wheel fastening part and the clip spring which are formed of a metallic material, the material preventing the occurrence of noise by contact between the steering wheel fastening part and the clip spring.

The clip spring may include: a ring part fastened to the airbag fastening part; and an extension part extended in a direction away from the ring part.

The airbag fastening part may include: a first clip mounting part which protrudes from the mounting plate, and to which the ring part is locked; and a second clip mounting part which is isolated from the first clip mounting part, and to which the extension part is locked.

The first clip mounting part may include: a ring fastening part to which the ring part is fastened; a separation prevention part protruding from an end portion of the ring fastening part, the end portion facing the steering wheel, and restricting separation of the ring part; and a locking stopper which is isolated from the ring fastening part, and to which an end portion of the ring part fastened to the ring fastening part is locked.

The ring part may include: a fastening ring bent to one side from the extension part, and fastened to the ring fastening part; and a locking end bent from the end portion of the fastening ring to the other side, protruding to the outside of the fastening ring, and locked to the locking stopper.

The second clip mounting part may include: a clip support part protruding from the mounting plate, contacted with the extension part in a state where the ring part is fastened to the first clip mounting part, and supporting a load applied to the extension part; and a mounting hole which is formed through the clip support part, and into which the extension part is inserted.

The mounting hole may include: a reference hole having a width corresponding to the cross section of the extension part; and a spare hole connected to the reference hole such that the extension part in the reference hole is moved in a direction away from the steering wheel fastening part by an external force.

The clip spring may include a separation prevention protrusion formed at a portion coupled to the spacer.

The steering wheel fastening part may include: a spacer support part protruding from the steering wheel; and a spacer locking part protruding from an end portion of the spacer support part, and locked to the spacer between the spacer and the mounting plate.

The spacer locking part may include: a regular locking part formed at a position facing the spacer, and contacted with the spacer; and an auxiliary locking part formed at a position facing the clip spring so as to be isolated from the clip spring, and contacted with the clip spring when the spacer is compressively deformed by a deployment force of the airbag.

DETAILED DESCRIPTION OF THE ILLUSTRATED EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
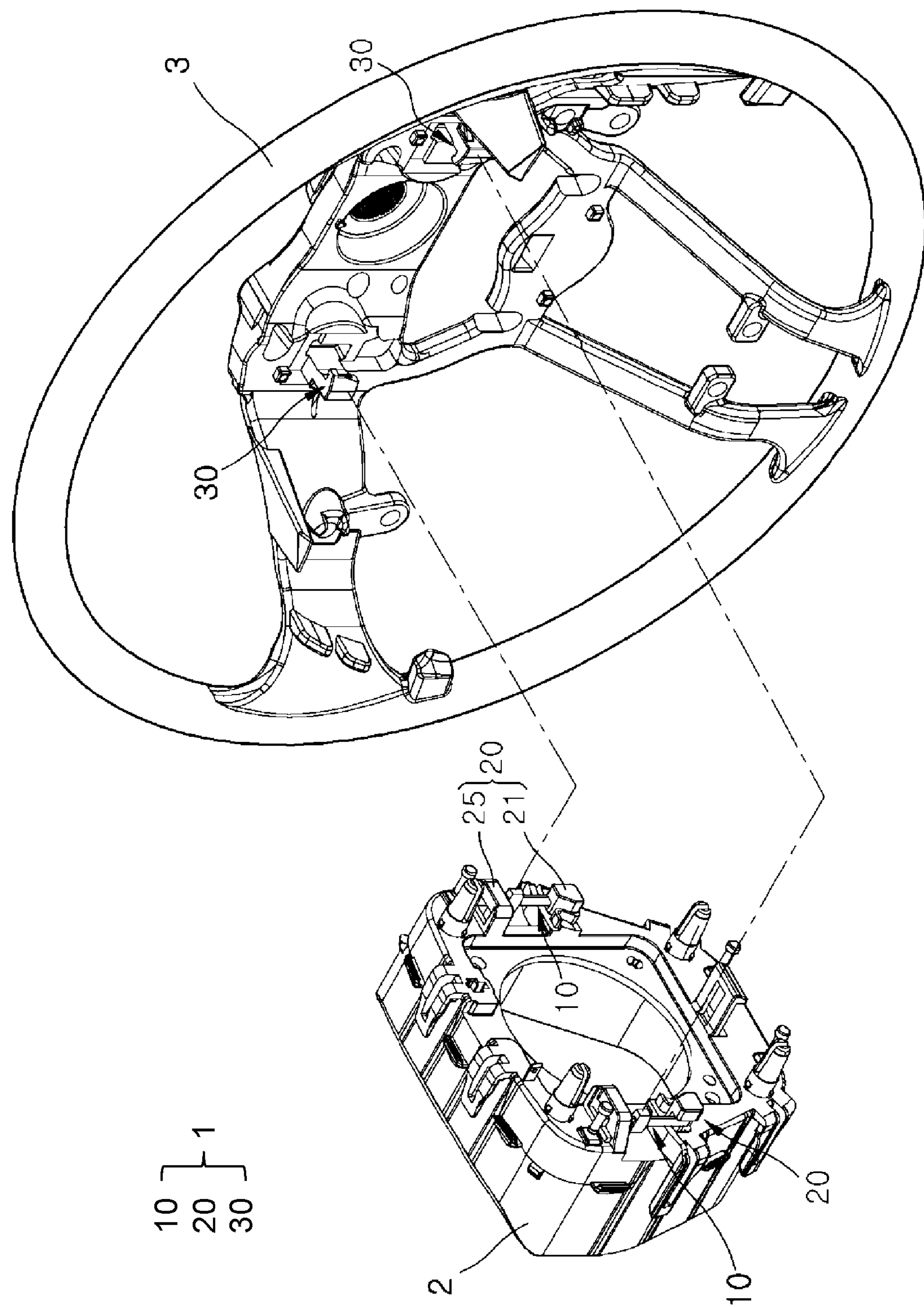
FIG. 1 is an exploded perspective view for describing a process of mounting a mounting plate on a steering wheel, the mounting plate including an airbag mounting apparatus in accordance with an embodiment of the present invention.
Figure 2:
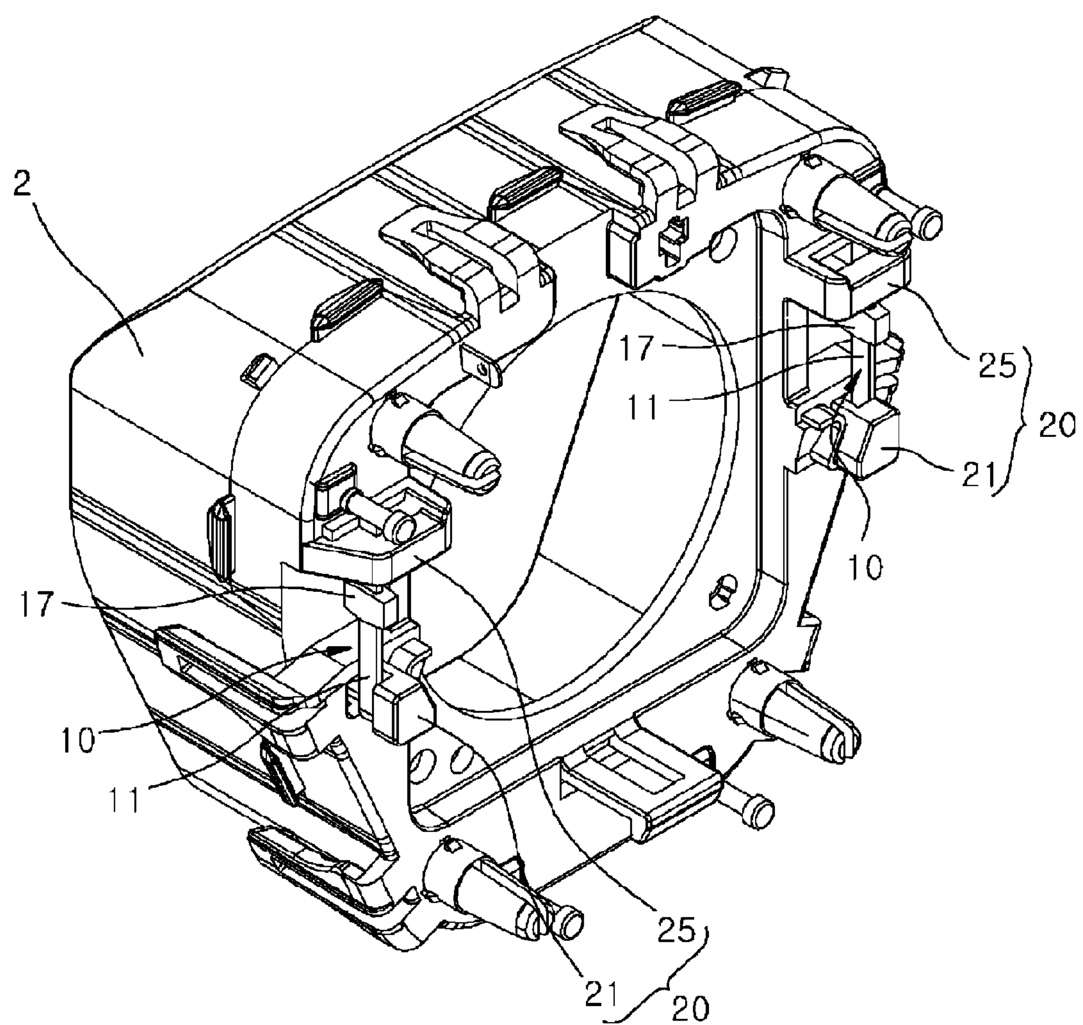
FIG. 2 is a rear perspective view illustrating a state in which a connection clip of the airbag mounting apparatus in accordance with the embodiment of the present invention is mounted on the mounting plate.

FIG. 1 is an exploded perspective view for describing a process of mounting a mounting plate on a steering wheel, the mounting plate including an airbag mounting apparatus in accordance with an embodiment of the present invention, and FIG. 2 is a rear perspective view illustrating a state in which a connection clip of the airbag mounting apparatus in accordance with the embodiment of the present invention is mounted on the mounting plate.

Figure 3:
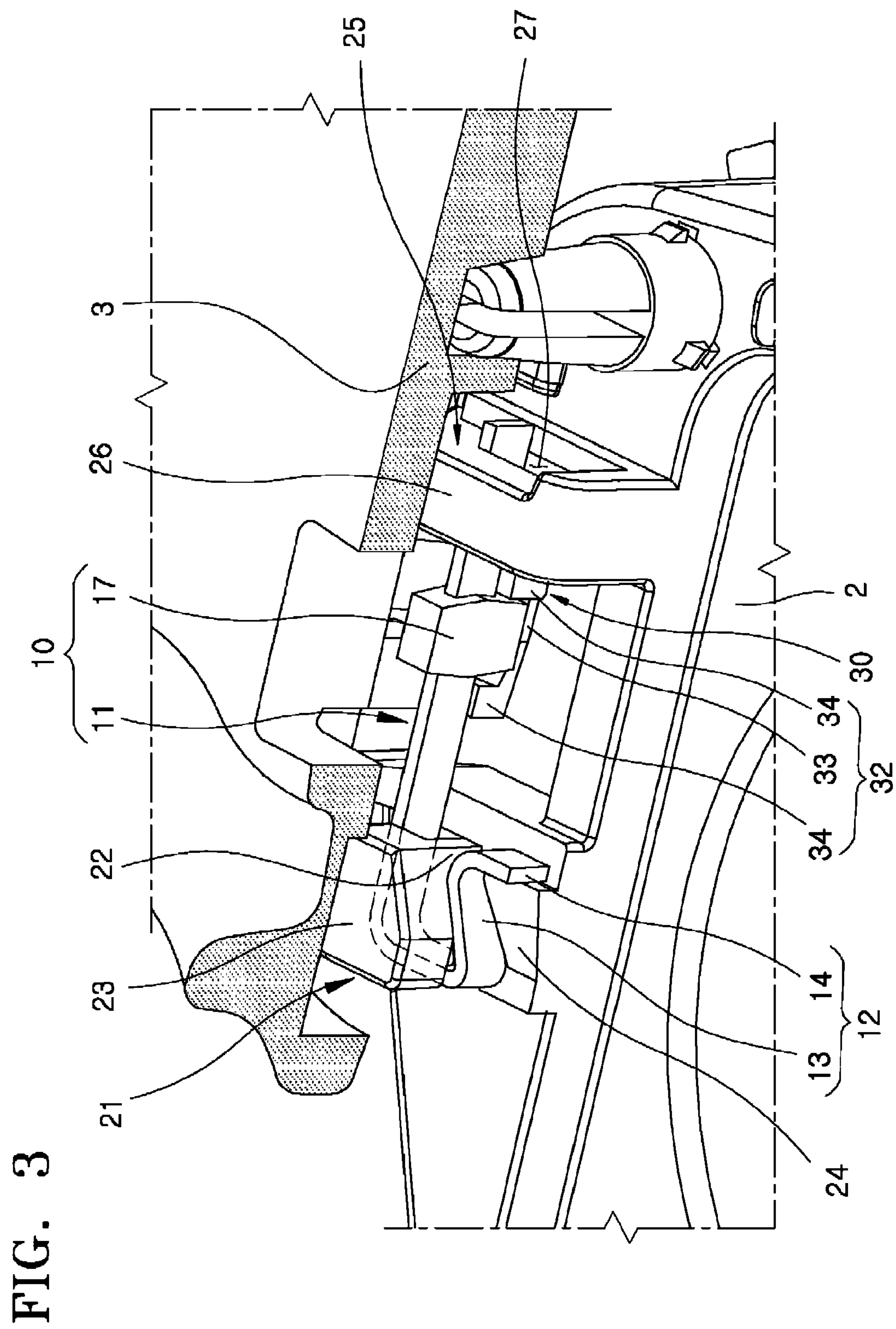
FIG. 3 is a perspective view of the airbag mounting apparatus in accordance with the embodiment of the present invention.
Figure 4:
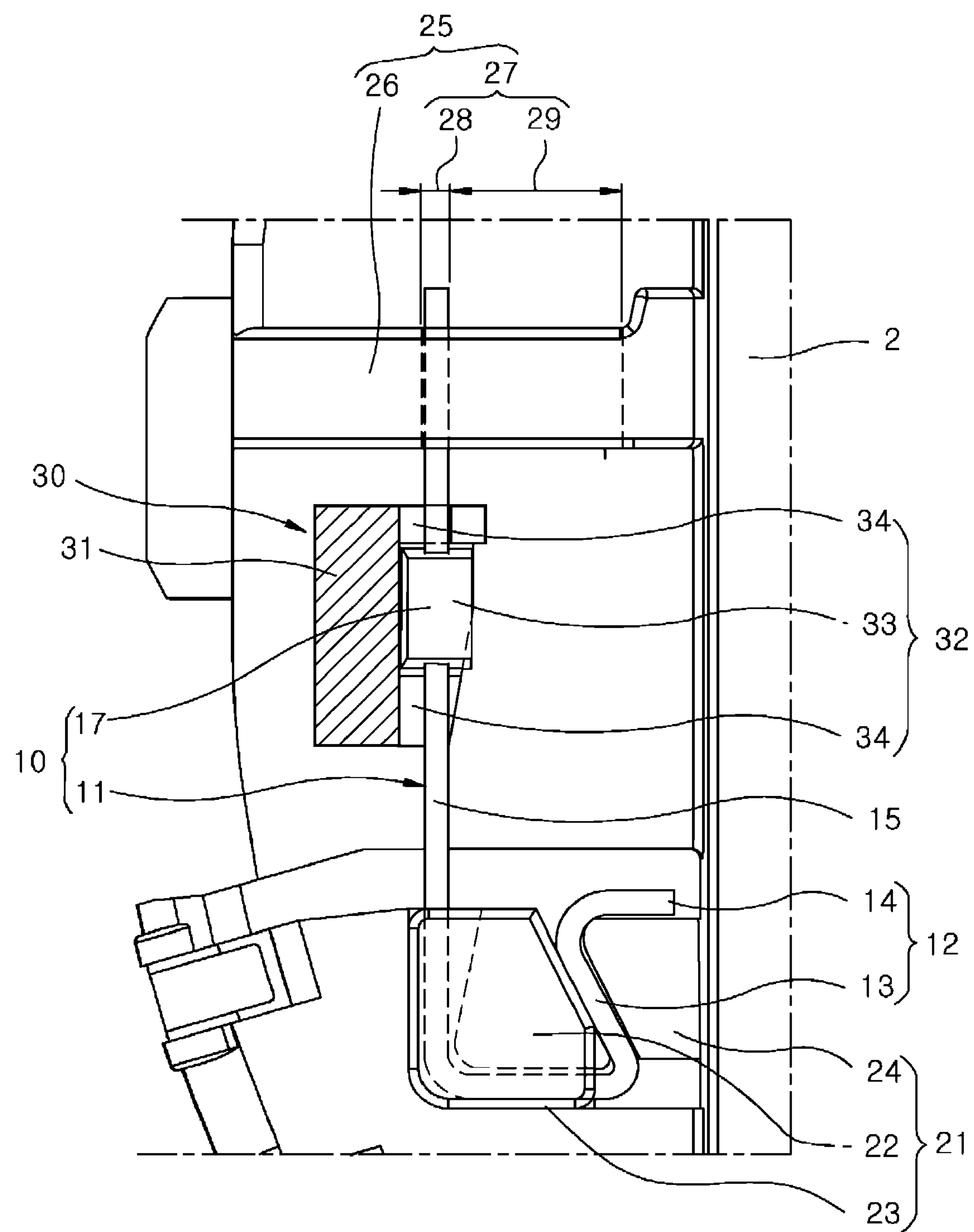
FIG. 4 is a rear view of the airbag mounting apparatus in accordance with the embodiment of the present invention.
Figure 5:
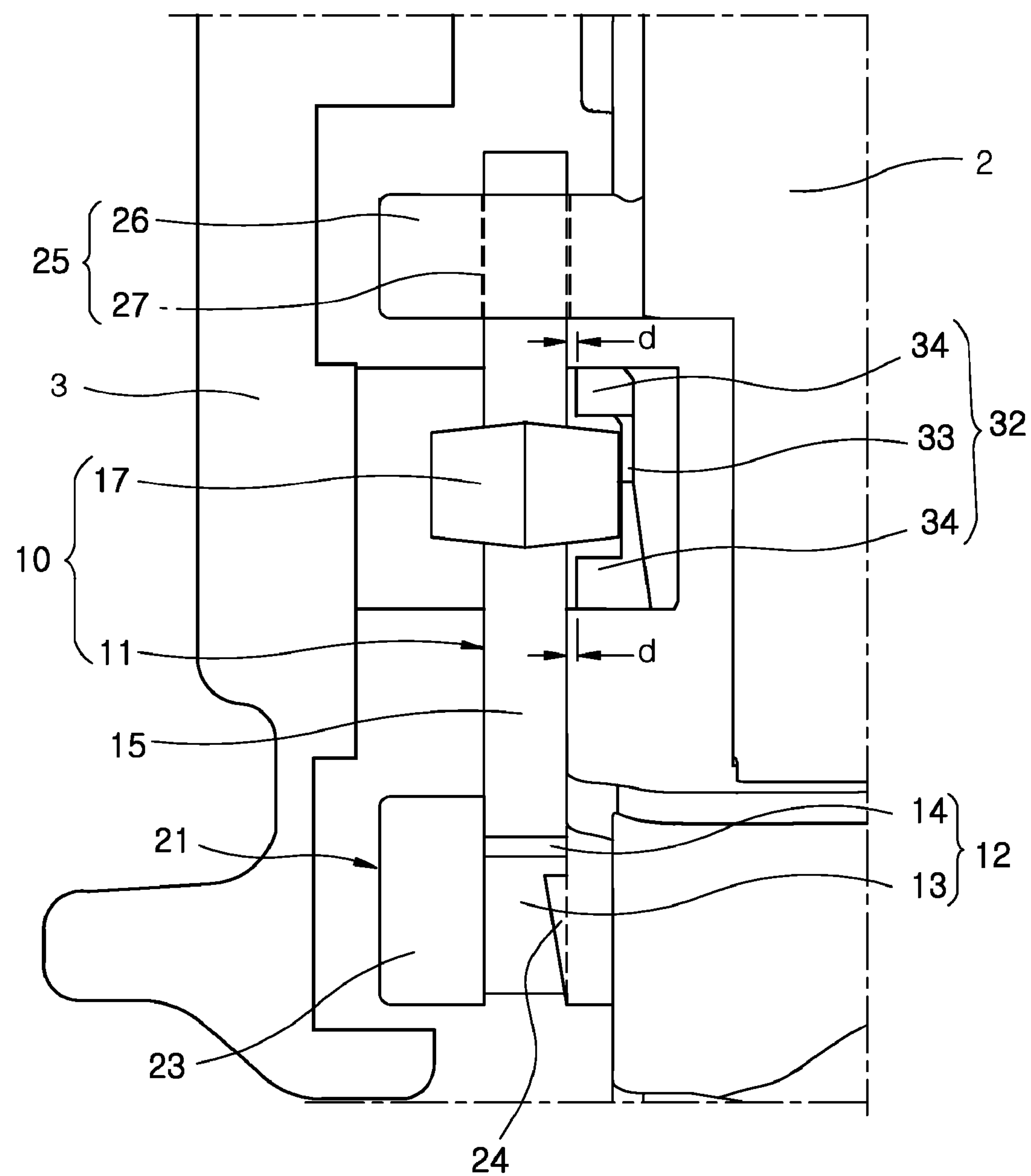
FIG. 5 is a side view of the airbag mounting apparatus in accordance with the embodiment of the present invention.

FIG. 3 is a perspective view of the airbag mounting apparatus in accordance with the embodiment of the present invention, FIG. 4 is a rear view of the airbag mounting apparatus in accordance with the embodiment of the present invention, and FIG. 5 is a side view of the airbag mounting apparatus in accordance with the embodiment of the present invention.

Figure 6:
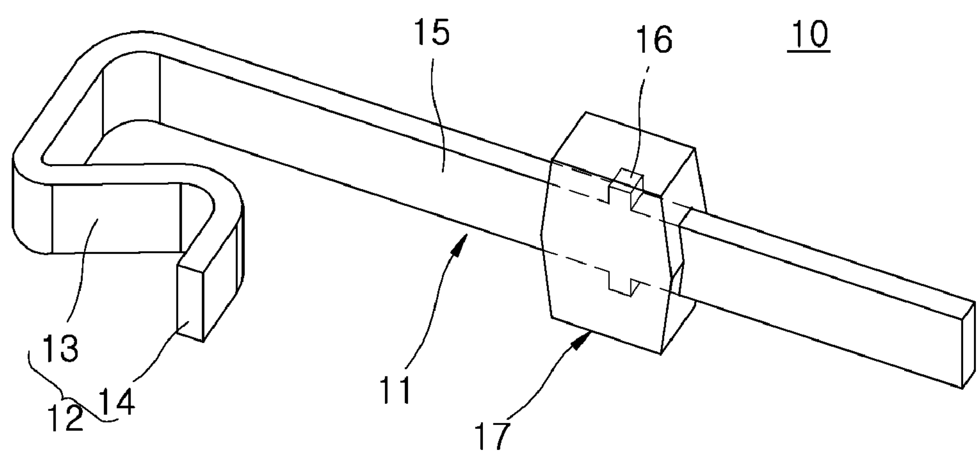
FIG. 6 is a perspective view of the connection clip of the airbag mounting apparatus in accordance with the embodiment of the present invention.
Figure 7:
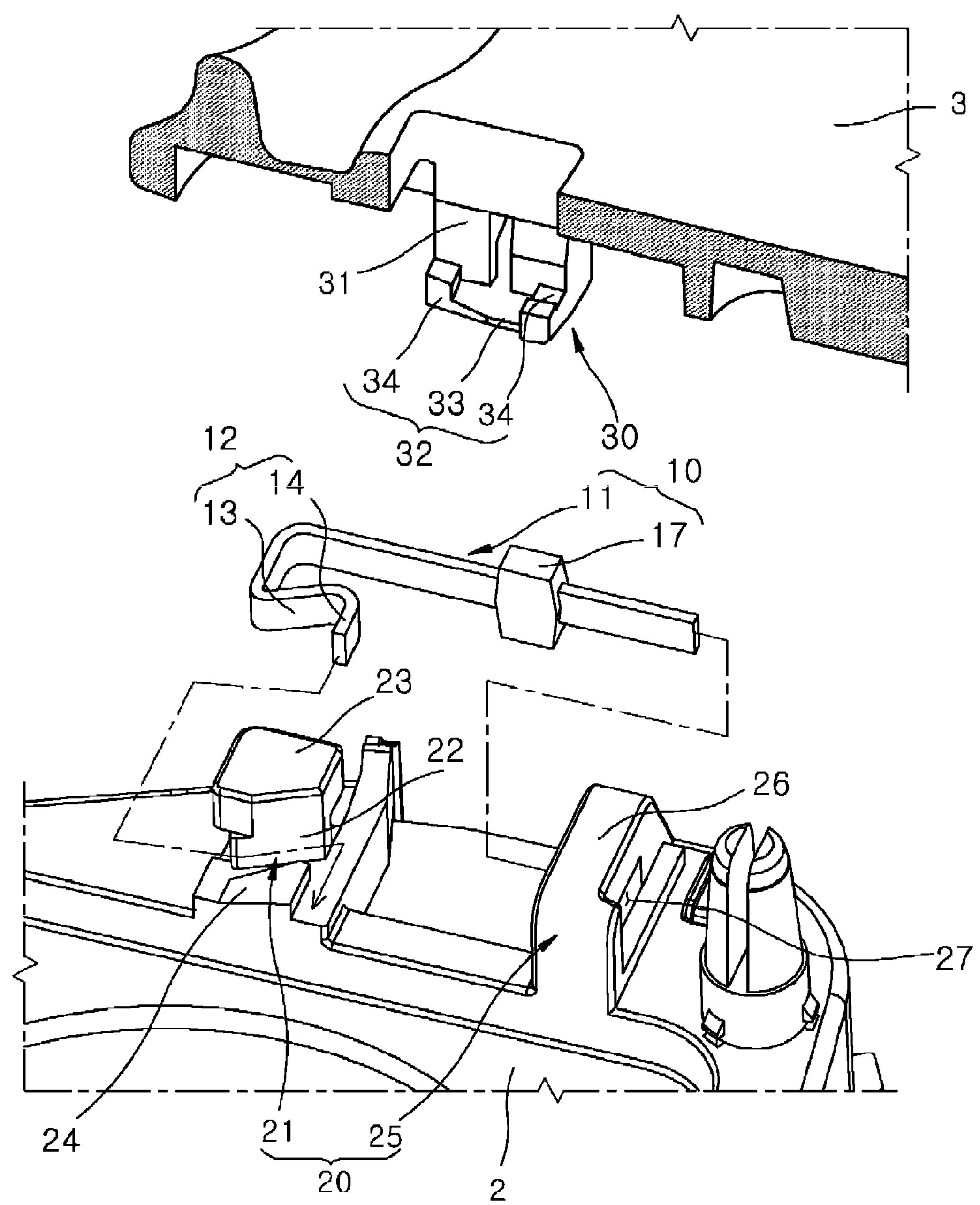
FIG. 7 is an exploded perspective view of the airbag mounting apparatus in accordance with the embodiment of the present invention.
Figure 8:
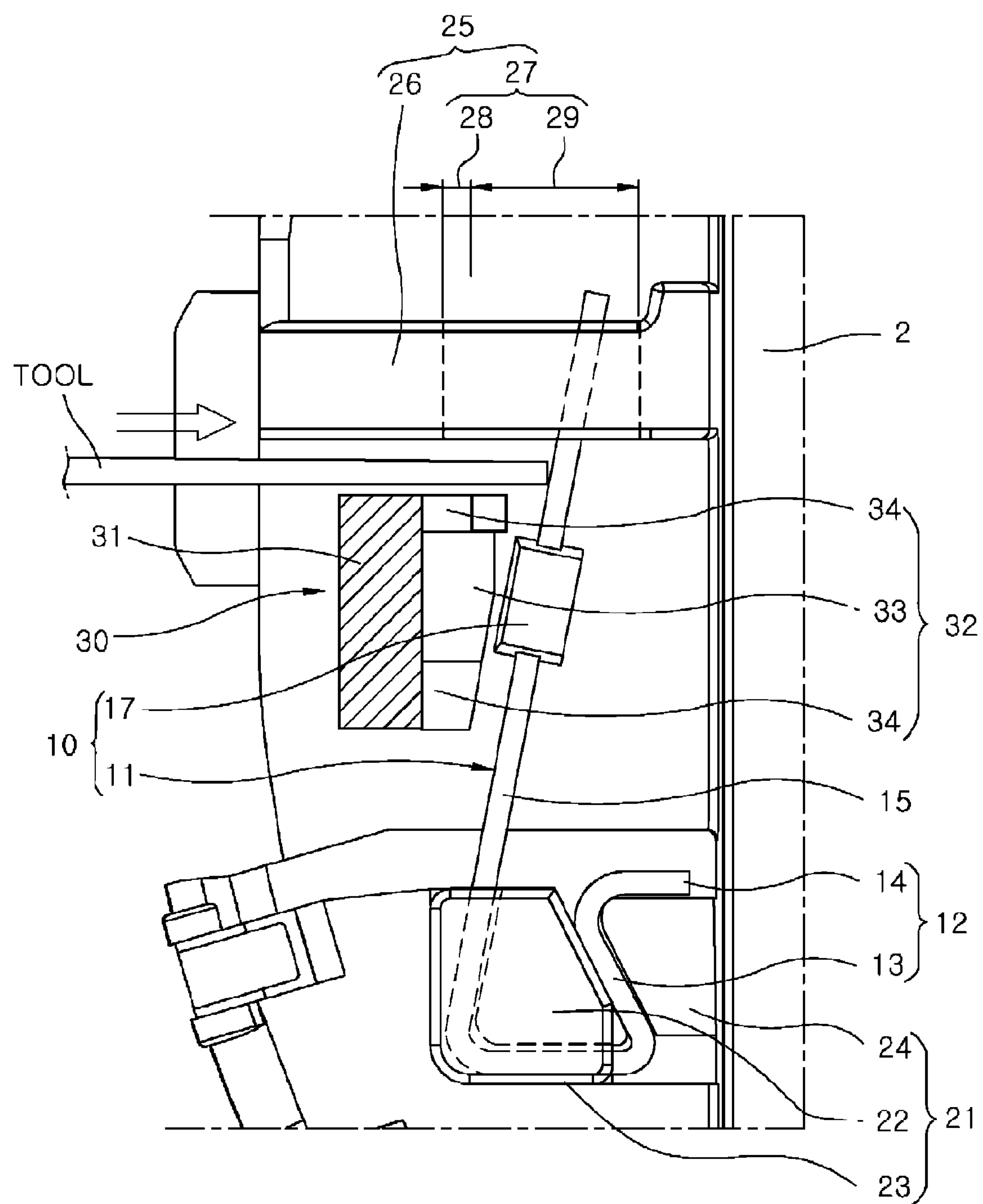
FIG. 8 is a perspective view for describing a process of separating the connection clip of the airbag mounting apparatus from a steering wheel fastening part.

FIG. 6 is a perspective view of the connection clip of the airbag mounting apparatus in accordance with the embodiment of the present invention, FIG. 7 is an exploded perspective view of the airbag mounting apparatus in accordance with the embodiment of the present invention, and FIG. 8 is a perspective view for describing a process of separating the connection clip of the airbag mounting apparatus from a steering wheel fastening part.

Figure 9:
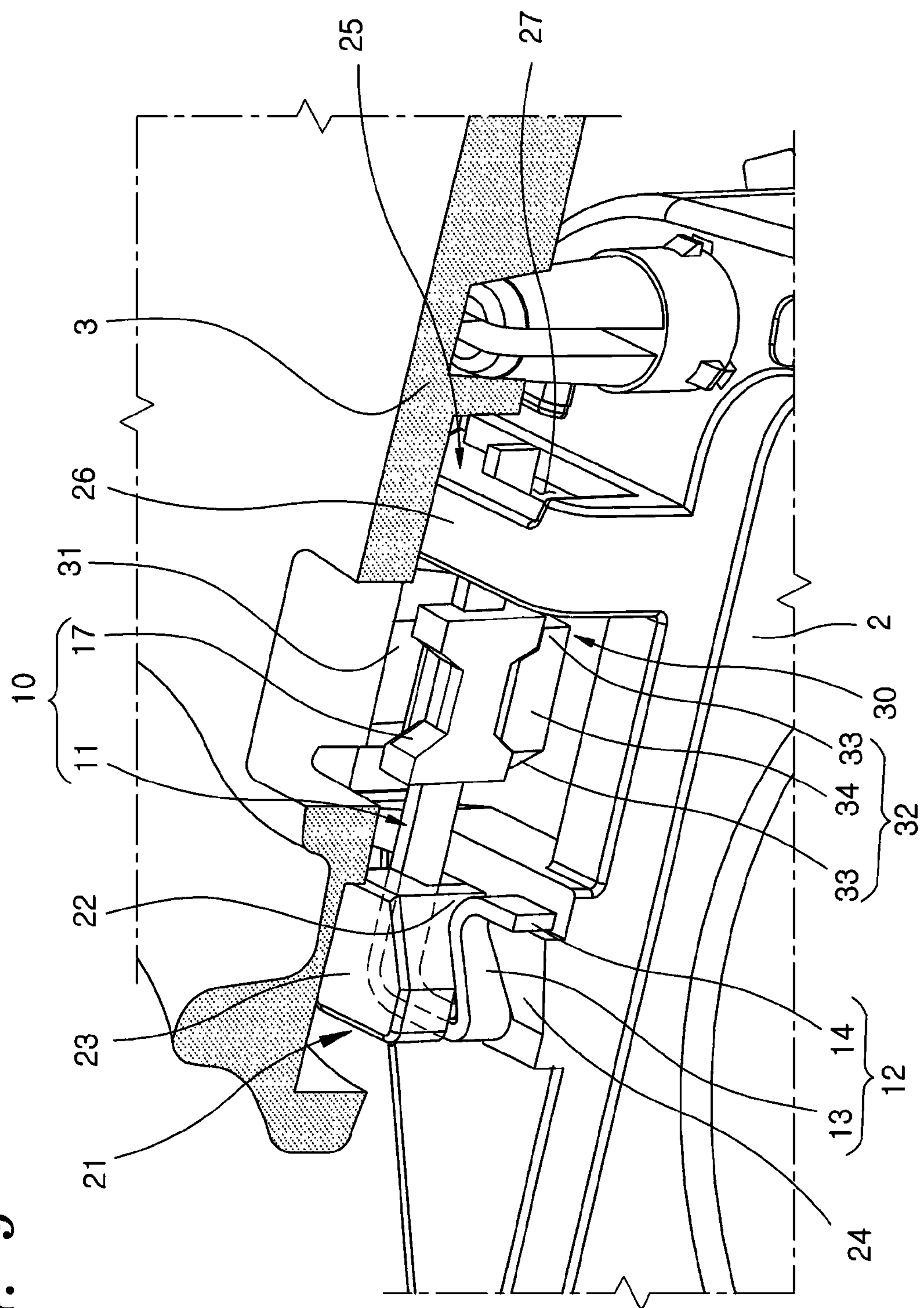
FIG. 9 is a perspective view of an airbag mounting apparatus in accordance with another embodiment of the present invention.
Figure 10:
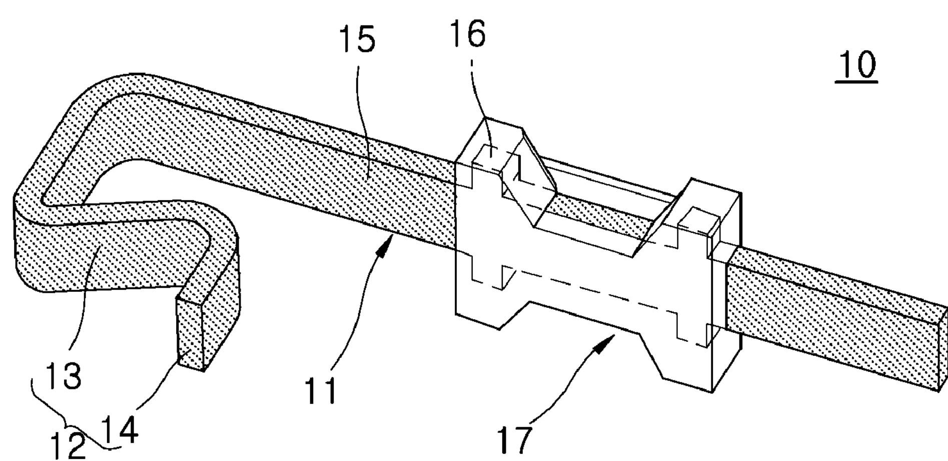
FIG. 10 is a perspective view of a connection clip of the airbag mounting apparatus in accordance with the embodiment of the present invention.
Figure 11:
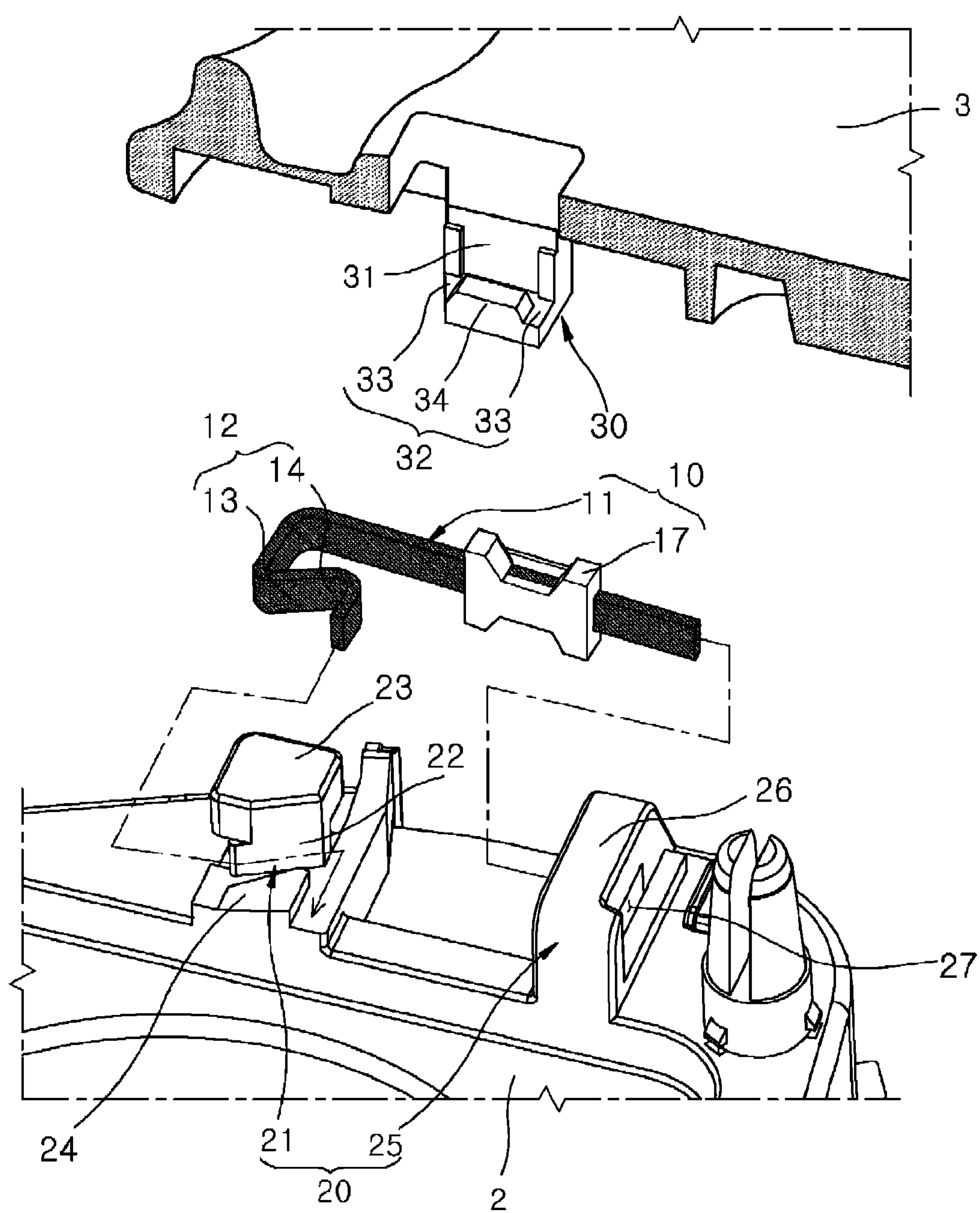
FIG. 11 is an exploded perspective view of the airbag mounting apparatus in accordance with the embodiment of the present invention.

FIG. 9 is a perspective view of an airbag mounting apparatus in accordance with another embodiment of the present invention, FIG. 10 is a perspective view of a connection clip of the airbag mounting apparatus in accordance with the embodiment of the present invention, and FIG. 11 is an exploded perspective view of the airbag mounting apparatus in accordance with the embodiment of the present invention.

Referring to FIGS. 1 and 2, the airbag mounting apparatus 1 in accordance with the embodiment of the present invention may include a connection clip 10, an airbag fastening part 20 and a steering wheel fastening part 30.

The connection clip 10 for fastening the mounting plate 2 of the airbag to the steering wheel 3 may be positioned between the mounting plate 2 of the airbag and the steering wheel 3. The connection clip 10 may be disposed at a plurality of spots isolated from each other. For example, as illustrated in FIGS. 1 and 2, the connection clip 10 may be disposed at two spots corresponding to the left and right sides of the mounting plate 2.

The airbag fastening part 20, on which the connection clip 10 is mounted, may protrude backward from the rear surface of the mounting plate 2 facing the steering wheel 3. The steering wheel fastening part 30, which is snap-fit fastened to the connection clip 10 mounted on the airbag fastening part 20, may protrude forward from the front surface of the steering wheel 3 facing the mounting plate 2.

Referring to FIGS. 6 and 7, the connection clip 10 in accordance with the embodiment of the present invention may include a clip spring 11 and a spacer 17.

The clip spring 11 may be formed of an elastic member such as a metallic material, and fastened and mounted on the airbag fastening part 20 by elasticity. Referring to FIG. 6, the clip spring 11 in accordance with the embodiment of the present invention may include a ring part 12, an extension part 15 and a separation prevention protrusion 16.

Referring to FIGS. 3 and 4, the ring part 12 may be fastened to a first clip mounting part 21 of the airbag fastening part 20. Referring to FIGS. 6 and 7, the ring part 12 in accordance with the embodiment of the present invention may include a fastening ring 13 and a locking end 14. The fastening ring 13 may be formed in a shape which is bent from the extension part 15 to one side. The locking end 14 may be formed in a shape which is bent to the other side from an end of the fastening ring 13, and protrude to the outside of the fastening ring 13.

For example, when the extension part 15 is extended in the vertical direction and the ring part 12 is formed at the bottom of the extension part 15, the fastening ring 13 may be bent toward the right top, and the locking end 14 may be bent to the right (refer to FIG. 4).

The extension part 15 may be extended toward the second clip mounting part 25 of the airbag fastening part 20 from the first clip mounting part 21 to which the ring part 12 is fastened. The end portion of the extension part 15, which is isolated from the ring part 12, may be mounted on the second clip mounting part 25. The end portions of the ring part 12 and the extension part 15 may serve as both end portions of the connection clip 10. As both end portions of the connection clip 10 are fastened to two separate spots corresponding to the first and second clip mounting parts 21 and 25, the connection clip 10 may be stably mounted on the mounting plate 2.

The separation prevention protrusion 16 may be formed on a portion of the extension part 15, which is coupled to the spacer 17. The spacer 17 may be integrated with the clip spring 11 through insert molding, and the separation prevention protrusion 16 may be formed to strengthen the coupling force between the clip spring 11 and the spacer 17. Thus, even when a load is continuously applied to the spacer 17, the spacer 17 can be prevented from being separated from the clip spring 11.

The spacer 17 may be coupled to the circumference of the middle portion of the clip spring 11, and snap-fit fastened to the steering wheel fastening part 30. The spacer 17 may include a material different from the clip spring 11, for example, synthetic resin. The spacer 17 may surround the circumference of the clip spring 11 including a metallic material, while having a preset thickness.

Referring to FIGS. 3 and 5, the clip spring 11 may be isolated by a distance "d" from the steering wheel fastening part 30 by the spacer 17. Thus, such a structure can prevent noise which may be caused through contact between the clip spring 11 and the steering wheel fastening part 30 including a metallic material.

Referring to FIGS. 3 and 7, the airbag fastening part 20 in accordance with the embodiment of the present invention may include a first clip mounting part 21 and a second clip mounting part 25.

The first clip mounting part 21 may be locked and fastened to the ring part 12, and protrude from the mounting plate 2. Referring to FIGS. 3 and 4, the first clip mounting part 21 in accordance with the embodiment of the present invention may include a ring fastening part 22, a separation prevention part 23 and a locking stopper 24.

The ring fastening part 22, to which the fastening ring 13 of the ring part 12 is fastened, may have a cross-sectional shape corresponding to the fastening ring 13 of the ring part 12. The ring fastening part 22 may protrude backward from the mounting plate 2. The separation prevention part 23 may be formed on an end portion of the ring fastening part 22, facing the steering wheel 3, or the rear end portion of the ring fastening part 22, and have an extended width. The separation prevention part 23 may restrict the movement and separation of the connection clip 10 including the fastening ring 13 in the forward and backward direction.

The locking stopper 24, which is locked to the locking end 14 of the ring part 12 fastened to the ring fastening part 22, may be isolated from the ring fastening part 22 by a distance corresponding to the thickness of the ring part 12. The locking stopper 24 may have a cross-sectional shape corresponding to one side of the ring part 12 including the locking end 14, and protrude backward from the mounting plate 2.

As illustrated in FIG. 4, when the fastening ring 13 is bent toward the right top and the locking end 14 is bent to the right, the locking stopper 24 may be formed at the right of the ring fastening part 22. At this time, the connection clip 10 including the fastening ring 13 may be locked to the locking stopper 24, and restricted from being moved and separated in the vertical direction and the side-to-side direction.

The second clip mounting part 25, on which the end portion of the extension part 15 is mounted, may be formed on the mounting plate 2 so as to protrude at a position isolated from the first clip mounting part 21. Referring to FIGS. 3 and 7, the second clip mounting part 25 in accordance with the embodiment of the present invention may include a clip support part 26 and a mounting hole 27.

The clip support part 26 may be formed on the rear surface of the mounting plate 2 so as to protrude backward. The mounting hole 27 may be formed through the clip support part 26. Referring to FIGS. 4 and 5, the mounting hole 27 may have the same height as the cross-section of the end portion of the extension part 15, but have a larger width than the end portion of the extension part 15.

When the ring part 12 is fastened to the first clip mounting part 21, the front and rear surfaces of the extension part 15 may be contacted with the clip support part 26 as illustrated in FIGS. 3 and 5. The clip support part 26 may support a load which is applied to the extension part 15 in the forward and backward direction, in a state where the clip support part 26 is contacted with the front and rear surfaces of the extension part 15. At this time, as illustrated in FIGS. 3 and 4, one side surface of the extension part 15 may be contacted with the clip support part 26 by an elastic force applied to the extension part 15 through the ring part 12.

The mounting hole 27 in accordance with the present embodiment may include a reference hole 28 and a spare hole 29 which are connected in the side-to-side direction. The reference hole 28 may be formed at one side of the mounting hole 27, which is in contact with the extension part 15, and have a width corresponding to the cross-section of the extension part 15. The spare hole 29 may be connected to the reference hole 28 such that the extension part 15 in the reference hole 28 can be moved in a direction away from the steering wheel fastening part 30.

When the connection clip 10 is mounted on the airbag fastening part 20, the ring part 12 may be elastically fastened to the first clip mounting part 21 in a state where the end portion of the extension part 15 is inserted into the mounting hole 27. Furthermore, when the airbag and the connection clip 10 are separated from the steering wheel 3 and the steering wheel fastening part 30, the extension part 15 may be easily isolated from the steering wheel fastening part 30 through an operation of pushing the extension part 15 with a tool as illustrated in FIG. 8.

Referring to FIGS. 3 and 7, the steering wheel fastening part 30 in accordance with the embodiment of the present invention may include a spacer support part 31 and a spacer locking part 32, and may be snap-fit fastened to the connection clip 10.

The spacer support part 31 may be formed at a position of the steering wheel 3, corresponding to the spacer 17, and protrude forward. The spacer support part 31 may be extended forward from the steering wheel 3 to a space between the spacer 17 and the mounting plate 2.

The spacer locking part 32 may be formed at the end of the spacer support part 31 so as to protrude toward the spacer 17. The spacer locking part 32 may be positioned between the spacer 17 and the mounting plate 2, and contacted with the spacer 17. Referring to FIGS. 3 and 5, the spacer locking part 32 in accordance with the embodiment of the present invention may include a regular locking part 33 and an auxiliary locking part 34.

The regular locking part 33 may be formed at a position of the spacer locking part 32, facing the spacer 17, and maintain a state in which the regular locking part 33 is contacted with the spacer 17 at normal times while the connection clip 10 is fastened to the steering wheel fastening part 30. In a normal state, the connection clip 10 may be locked to the regular locking part 33 and restricted from being separated and moved forward.

The auxiliary locking part 34 may be formed at a position of the spacer locking part 32, facing the clip spring 11, and isolated from the clip spring 11. The auxiliary locking part 34 may maintain a preset distance "d" from the extension part 15 of the clip spring 11 in a normal state. However, when the airbag is deployed, the auxiliary locking part 34 may be compressively deformed in the direction where the spacer 17 is pushed close to the regular locking part 33 by the deployment force of the airbag, and contacted with the metallic clip spring 11. When an excessive load larger than a preset value is applied to the connection clip 10 in case where the airbag is deployed, the auxiliary locking part 34 may stably support the connection clip 10 with the regular locking part 33.

The connection clip 10 and the steering wheel fastening part 30 in accordance with the embodiment of the present invention are neither limited to the shapes illustrated in FIGS. 3, 6 and 7, nor limited to specific structures and shapes including another embodiment illustrated in FIGS. 9 to 11.

Referring to FIGS. 9 and 11, the middle portion of the spacer 17 of the clip spring 11 in accordance with another embodiment of the present invention may be formed in a concave shape such that the clip spring 11 is exposed to the outside, and the spacer locking part 32 of the steering wheel fastening part 30 may have a shape corresponding to the spacer 17 or particularly a shape in which an auxiliary locking part 34 is formed between a pair of regular locking parts 33. When the present embodiment is described, the detailed descriptions of the same components and operations as those of the above-described embodiment are omitted herein.

The airbag mounting apparatus 1 in accordance with the present embodiment can stably fix the airbag to the steering wheel 3 through a simple structure in which the connection clip 10 is installed, the airbag fastening part 20 having the connection clip 10 mounted thereon is formed on the mounting plate 2 of the airbag, and the steering wheel fastening part 30 snap-fit fastened to the connection clip 10 is formed on the steering wheel 3.

Furthermore, the airbag mounting apparatus 1 can the airbag to the steering wheel 3 through only one part corresponding to the connection clip 10 in which the clip spring 11 and the spacer 17 are integrated. Thus, the number of parts can be reduced, which makes it possible to reduce the number of processes and the cost while facilitating quality control.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus comprising:
- a connection clip disposed between a steering wheel and a mounting plate of an airbag;
- an airbag fastening part formed on the mounting plate, and having the connection clip mounted thereon; and
- a steering wheel fastening part formed on the steering wheel, and snap-fit fastened to the connection clip mounted on the airbag fastening part, wherein:

the connection clip comprises:
- a clip spring fastened to the airbag fastening part; and
- a spacer coupled to the clip spring, and contacted with the steering wheel fastening part;

the clip spring comprises a metallic material; and the spacer comprises a material different from the steering wheel fastening part and the clip spring which are formed of a metallic material, the material of the spacer preventing the occurrence of noise by contact between the steering wheel fastening part and the clip spring.

2. The airbag apparatus of claim 1, wherein the clip spring comprises:
- a ring part fastened to the airbag fastening part; and
- an extension part extended in a direction away from the ring part.

3. The airbag apparatus of claim 2, wherein the airbag fastening part comprises:
- a first clip mounting part which protrudes from the mounting plate, and to which the ring part is locked; and
- a second clip mounting part which is isolated from the first clip mounting part, and to which the extension part is locked.

4. The airbag apparatus of claim 3, wherein the first clip mounting part comprises:
- a ring fastening part to which the ring part is fastened;
- a separation prevention part protruding from an end portion of the ring fastening part, the end portion facing the steering wheel, and restricting separation of the ring part; and
- a locking stopper which is isolated from the ring fastening part, and to which an end portion of the ring part fastened to the ring fastening part is locked.

5. The airbag apparatus of claim 4, wherein the ring part comprises:
- a fastening ring bent to one side from the extension part, and fastened to the ring fastening part; and
- a locking end bent from the end portion of the fastening ring to the other side, protruding to the outside of the fastening ring, and locked to the locking stopper.

6. The airbag apparatus of claim 3, wherein the second clip mounting part comprises:
- a clip support part protruding from the mounting plate, contacted with the extension part in a state where the ring part is fastened to the first clip mounting part, and supporting a load applied to the extension part; and
- a mounting hole which is formed through the clip support part, and into which the extension part is inserted.

7. The airbag apparatus of claim 6, wherein the mounting hole comprises:
- a reference hole having a width corresponding to the cross section of the extension part; and
- a spare hole connected to the reference hole such that the extension part in the reference hole is moved in a direction away from the steering wheel fastening part by an external force.

8. The airbag apparatus of claim 1, wherein the clip spring comprises a separation prevention protrusion formed at a portion coupled to the spacer.

9. The airbag apparatus of claim 1, wherein the steering wheel fastening part comprises:
- a spacer support part protruding from the steering wheel; and
- a spacer locking part protruding from an end portion of the spacer support part, and locked to the spacer between the spacer and the mounting plate.

10. The airbag apparatus of claim 9, wherein the spacer locking part comprises:
- a regular locking part formed at a position facing the spacer, and contacted with the spacer; and
- an auxiliary locking part formed at a position facing the clip spring so as to be isolated from the clip spring, and contacted with the clip spring when the spacer is compressively deformed by a deployment force of the airbag.

* * * * *